United States Patent
Sorlier et al.

(10) Patent No.: US 10,794,425 B2
(45) Date of Patent: Oct. 6, 2020

(54) MECHANICAL ASSEMBLY AND MECHANICAL DEVICE

(71) Applicant: SKF Aerospace France S.A.S, Montigny-le-Bretonneux (FR)

(72) Inventors: Bruno Sorlier, Valence (FR); Alexandre Aury, Valence (FR); Matthieu Miolane, Lyons (FR)

(73) Assignee: SKF Aerospace France S.A.S, Montigny-le-Bretonneux (FR)

(*) Notice: Subject to any disclaimer, the term of this patent is extended or adjusted under 35 U.S.C. 154(b) by 0 days.

(21) Appl. No.: 16/444,292

(22) Filed: Jun. 18, 2019

(65) Prior Publication Data

US 2020/0025250 A1    Jan. 23, 2020

(30) Foreign Application Priority Data

Jul. 17, 2018 (FR) ..................... 18 56596

(51) Int. Cl.
*F16C 33/66* (2006.01)
*F16C 33/10* (2006.01)
*F16C 35/073* (2006.01)

(52) U.S. Cl.
CPC ........ *F16C 33/1065* (2013.01); *F16C 35/073* (2013.01)

(58) Field of Classification Search
CPC .................... F16C 33/6674; F16C 33/6677
USPC ...................................................... 384/475
See application file for complete search history.

(56) References Cited

U.S. PATENT DOCUMENTS

| | | | |
|---|---|---|---|
| 4,194,797 A | | 3/1980 | Hormann et al. |
| 4,334,720 A | * | 6/1982 | Signer ..................... F16O 33/60 384/475 |
| 5,192,139 A | * | 3/1993 | Hiramoto ............. B23Q 11/127 384/476 |
| 6,732,600 B2 | * | 5/2004 | Greubel ................ F16C 19/184 74/424.71 |
| 7,175,771 B2 | * | 2/2007 | Bridges ..................... B04B 1/02 210/787 |
| 7,178,987 B2 | * | 2/2007 | Bridges ..................... F02C 7/06 384/475 |
| 8,616,777 B1 | | 12/2013 | Smith et al. |
| 9,382,945 B2 | | 7/2016 | Doki-Thonon et al. |
| 9,441,541 B2 | * | 9/2016 | Wotzak ................... F01D 25/18 |
| 9,599,161 B2 | * | 3/2017 | Walker .................... F16C 33/60 |

(Continued)

FOREIGN PATENT DOCUMENTS

DE        3617544 A1    11/1987
DE    102014210850 A1    12/2015
(Continued)

*Primary Examiner* — Phillip A Johnson
(74) *Attorney, Agent, or Firm* — Garcia-Zamor Intellectual Property Law; Ruy Garcia-Zamor; Bryan Peckjian

(57) ABSTRACT

A mechanical assembly including a shaft, a mechanical device providing, a bearing mounted on the shaft and including at least one ring that is able to move in rotation about the shaft, a lubrication system having a channel to allow lubricant fluid to flow, formed at the interface between the shaft and the bearing, distribution ducts for lubricant fluid, formed in the bearing and fluidically connected to the channel. The channel provides at least one constriction to create a loss of head of the lubricant fluid flowing in the channel.

10 Claims, 5 Drawing Sheets

(56) References Cited

U.S. PATENT DOCUMENTS

| | | | |
|---|---|---|---|
| 2006/0062504 A1* | 3/2006 | Wilton | F01D 25/18 |
| | | | 384/475 |
| 2012/0155793 A1* | 6/2012 | Solfrank | F16O 33/6659 |
| | | | 384/475 |
| 2014/0099199 A1 | 4/2014 | Kerr et al. | |
| 2014/0254963 A1 | 9/2014 | Blair et al. | |
| 2018/0119742 A1 | 5/2018 | Modrzejewski et al. | |

FOREIGN PATENT DOCUMENTS

| | | |
|---|---|---|
| DE | 102015219155 A1 | 4/2017 |
| EP | 1406026 A1 | 4/2004 |
| EP | 1640627 A1 | 3/2006 |
| EP | 2541087 A2 | 1/2013 |
| EP | 2886894 A1 | 6/2015 |
| FR | 2332452 A1 | 6/1977 |
| FR | 3015599 A1 | 6/2015 |
| JP | H04228922 A | 8/1992 |
| JP | 2012021624 A | 2/2012 |

* cited by examiner

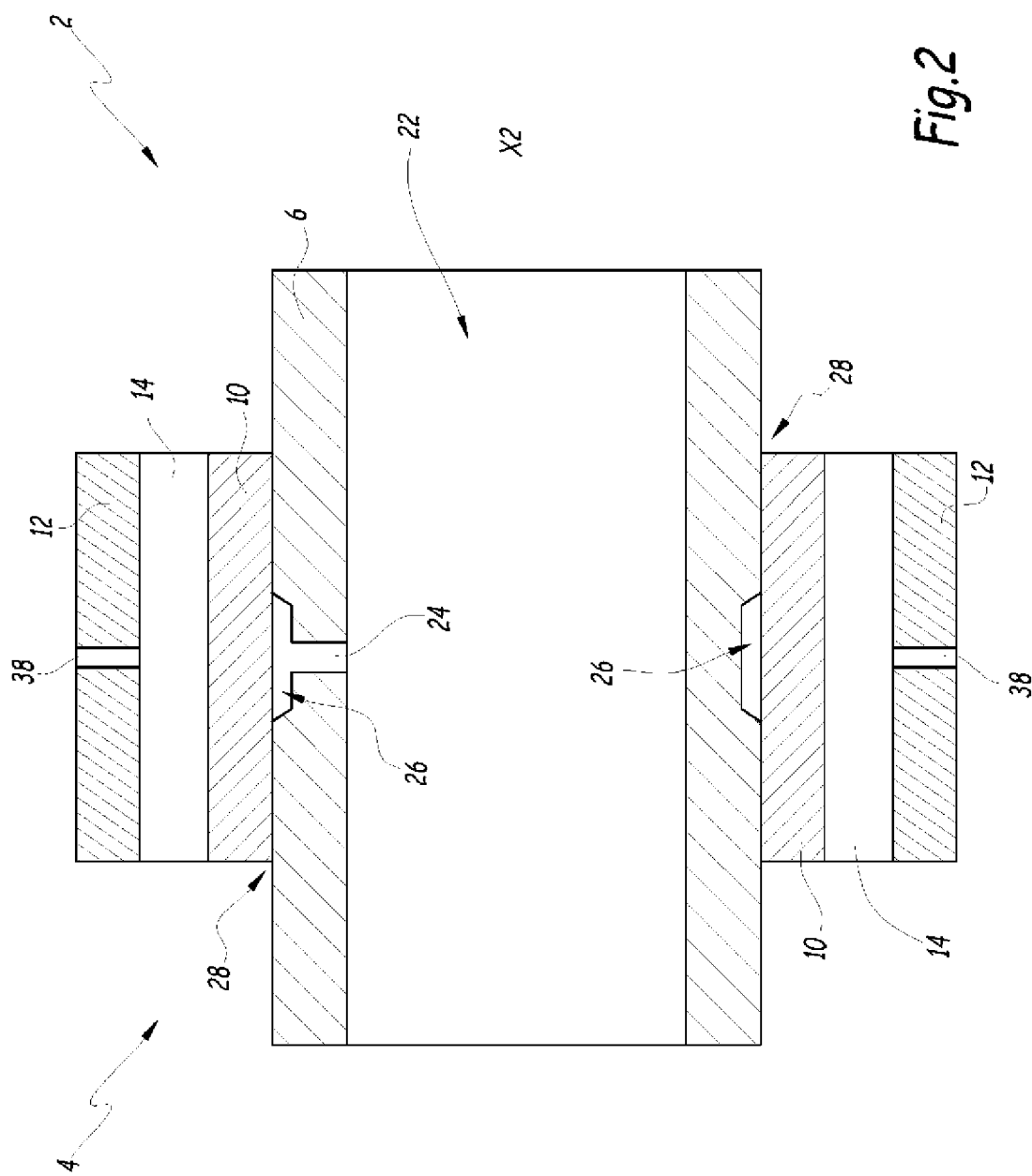

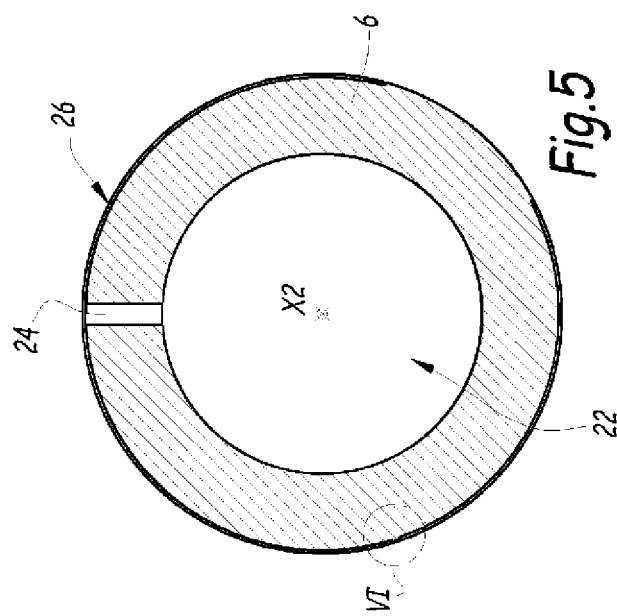
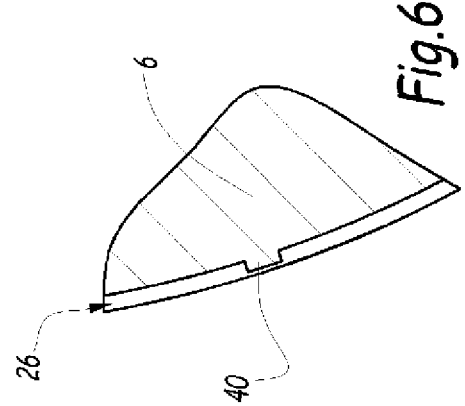
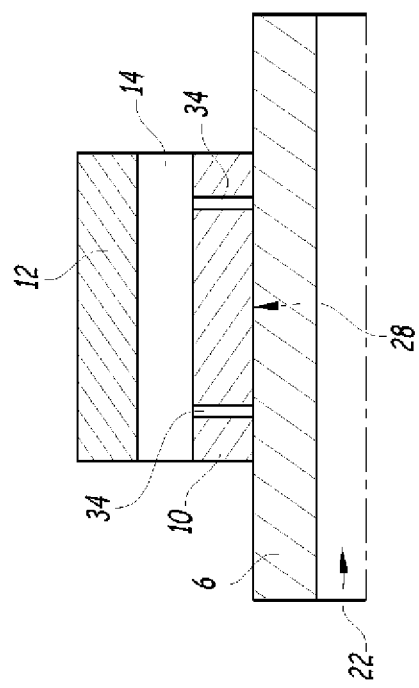
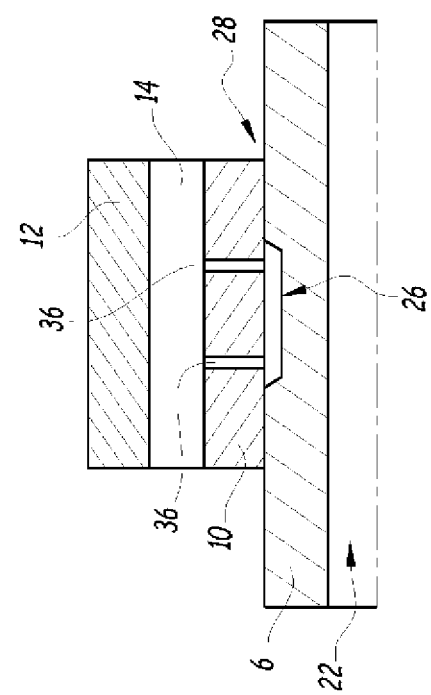

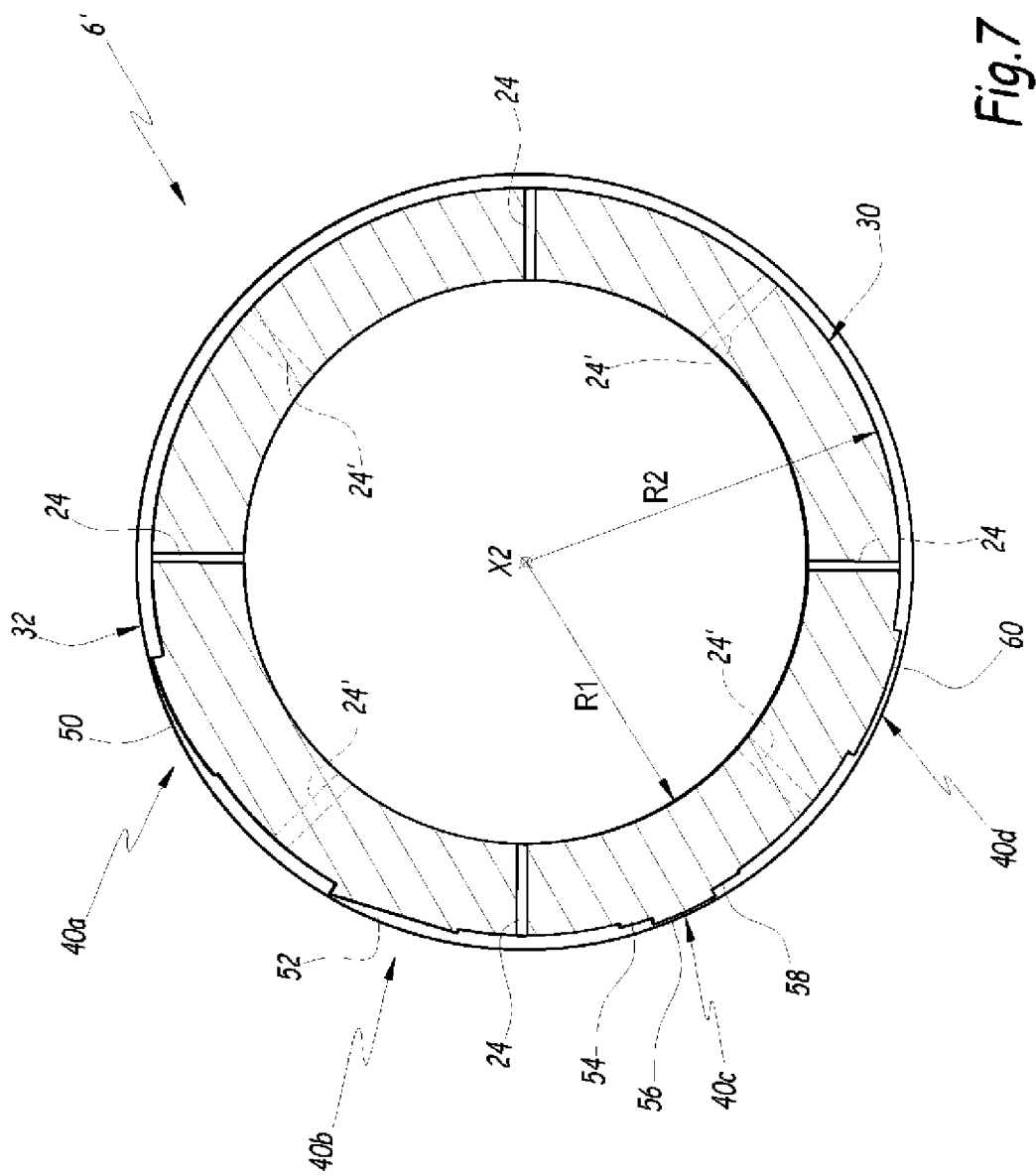

MECHANICAL ASSEMBLY AND MECHANICAL DEVICE

CROSS-REFERENCE TO RELATED APPLICATIONS

This application claims priority to French patent application no. 1856596 filed on Jul. 17, 2018, the contents of which are fully incorporated herein by reference.

FIELD OF THE INVENTION

The present invention relates to a mechanical assembly comprising a mechanical device. The invention also relates to a mechanical device.

The invention relates in particular to the field of lubrication of mechanical devices such as bearings, for example ball bearings.

BACKGROUND OF THE INVENTION

Conventionally, a mechanical device such as a bearing comprises a fixed ring and a moving ring. The fixed ring is able to be mounted on a shaft while the moving ring is mounted coaxially around the fixed ring and can rotate about the latter. A raceway formed between the fixed and moving rings may comprise rolling elements such as balls or rollers.

These mechanical devices may further comprise an integrated lubrication system for the purpose of supplying and distributing a lubricant fluid in the mechanical device, for example in order to lubricate the raceway and/or the outer perimeter of the moving ring and/or the interface between the shaft and the fixed ring.

EP-2 886 894-A1 describes an example of a mechanical device of this kind.

In certain applications, in particular applications in which the device is subject to high acceleration during operation, it can happen that the lubricant is not adequately distributed within the mechanical device, which can lead to premature failures of the device in regions which are inadequately lubricated.

BRIEF SUMMARY OF THE INVENTION

Thus, the invention proposes improving the distribution of a lubricant within a mechanical device comprising a bearing and a lubrication system.

To that end, the invention relates to a mechanical assembly comprising:

a shaft;
a mechanical device comprising:
a bearing mounted on the shaft and including at least one ring that is able to move in rotation about the shaft;
a lubrication system comprising:
a channel to allow lubricant fluid to flow, formed at the interface between the shaft and the bearing;
distribution ducts for lubricant fluid, formed in the bearing and fluidically connected to the channel;
in which the channel comprises at least one constriction to create a loss of head of the lubricant fluid flowing in the channel.

By virtue of the invention, the constriction locally restricts the flow of lubricant in the channel so as to create losses of fluid head in a controlled manner, thus making it possible to control and optimize the distribution of the lubricant while the device is in operation.

According to advantageous but non-compulsory aspects of the invention, a mechanical assembly of this kind may incorporate one or more of the following features, considered in isolation or according to any technically possible combination:

the channel and the at least one constriction are formed on an inner face of the bearing, facing an outer face of the shaft.

the channel is formed on an outer face of the shaft, the at least one constriction associated with this channel including an element formed on an inner face of the bearing, facing the outer face of the shaft, the element extending into the channel; or the channel is formed on an inner face of the bearing facing an outer face of the shaft, the at least one constriction associated with this channel including an element formed on the outer face of the shaft, the element extending into the channel.

the channel and the at least one constriction are formed on an outer face of the shaft.

the shaft includes a feed duct for lubricant fluid and at least one feed orifice, each feed orifice fluidically connecting the feed duct to the supply channel.

the shaft comprises multiple feed orifices connected to a same channel, and the channel comprises multiple constrictions, the constrictions being distributed along the channel such that each channel portion extending between two consecutive feed orifices comprises at most one constriction.

each constriction comprises a local reduction in the depth of the channel and/or a local reduction in the width of the channel and/or a local modification in the shape of the bottom of the channel.

the bearing comprises a fixed ring mounted directly on the shaft, the moving ring being mounted in rotation about the fixed ring, the inner face of the bearing being an inner face of the fixed ring.

According to another aspect, the invention relates to a mechanical device for forming a mechanical assembly according to the invention, the mechanical device comprising:

a bearing able to be mounted on a shaft and including at least one ring that is able to move in rotation about the shaft;
a lubrication system comprising:
a channel to allow lubricant fluid to flow, formed at an interface between the shaft and the bearing;
distribution ducts for lubricant fluid, formed in the bearing and fluidically connected to the channel;
in which the channel comprises at least one constriction to create a loss of head of the lubricant fluid flowing in the channel, the channel and the at least one constriction being formed on an inner face of the bearing intended to face an outer face of the shaft when the bearing is mounted on the shaft.

According to advantageous but non-compulsory aspects, the bearing is a rolling-element bearing, preferably a ball bearing.

BRIEF DESCRIPTION OF THE SEVERAL VIEWS OF THE DRAWING

The invention will be better understood, and other advantages of the invention will emerge more clearly, in light of the following description of an embodiment of a mechanical assembly, provided solely by way of example and with reference to the appended drawings, in which:

FIG. 2 shows, schematically, the mechanical assembly of FIG. 1 as seen in longitudinal section in the plane II II of FIG. 1;

FIG. 3 shows, schematically, a detail of the mechanical assembly of FIG. 1 as seen in section in the plane III III of FIG. 1;

FIG. 4 shows, schematically, a detail of the mechanical assembly of FIG. 1 as seen in section in the plane IV IV of FIG. 1;

FIG. 5 shows, schematically, as seen in in cross section, part of the mechanical assembly of FIG. 1 comprising a lubricating fluid channel in which is formed a constriction according to one embodiment of the invention;

FIG. 6 is an enlarged view of region VI of FIG. 5;

FIG. 7 shows, schematically, as seen in in cross section, part of a mechanical assembly according to another embodiment, comprising a lubricating fluid channel in which constrictions are formed.

DETAILED DESCRIPTION OF THE INVENTION

Figure 1:
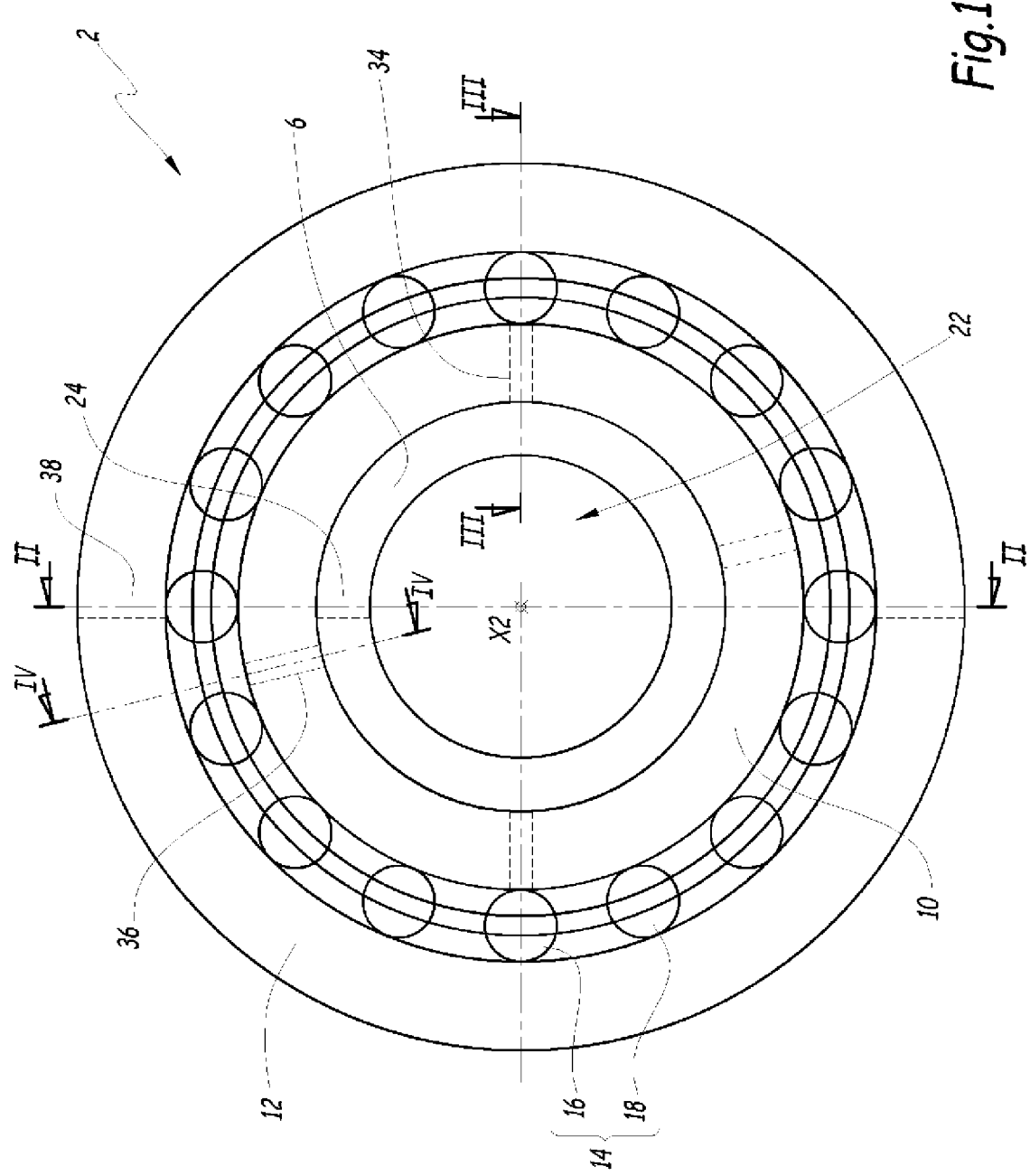
FIG. 1 shows, schematically, as seen in in cross section, a mechanical assembly comprising a mechanical device according to one embodiment of the invention.

FIGS. 1 to 6 show a first embodiment of a mechanical assembly 2 comprising a mechanical device 4 and a shaft 6. The shaft 6 extends along a longitudinal axis X2 of the assembly 2. For example, the shaft 6 is cylindrical in shape, with its centre on the axis X2.

According to embodiments, the device 4 comprises a bearing mounted on the shaft 6. For example, the device 4 is a rolling-element bearing such as a ball bearing. As a variant, the device 4 is a journal bearing or a spherical bearing.

As illustrated in FIGS. 1 to 4, the device 4 comprises a fixed ring 10 and a moving ring 12. The fixed ring 10 is mounted directly on the shaft 6 and the moving ring 12 is mounted around the fixed ring 10. Thus, in this instance the moving ring 12 is outside the fixed ring 10. The rings 10 and 12 are aligned coaxially around the axis X2. The fixed ring 10 is secured to the shaft 6 with no degree of freedom in rotation about the shaft 6. The moving ring 12 is free to rotate about the fixed ring 10, and thus about the shaft 6.

The device 4 also comprises an intermediate cage 14 including an annular portion 18 on which are mounted rolling elements 16 such as balls or rollers. The cage 14 is interposed between the rings 10 and 12, for example along a raceway created at the interface between the rings 10 and 12. As a variant, the cage 14 may be omitted when the device 4 is a journal bearing or a spherical bearing.

By way of illustrative and non-limiting example, the assembly 2 may be used in a machine, for example a mechanism for transmitting movement, such as an epicyclic gearset. According to this example, the epicyclic gearset comprises a planet carrier on which the device 4 is mounted; the moving ring 12 may then comprise teeth on its outer perimeter so as to form a gearwheel that is able to mesh with other components of the machine.

The device 4 further comprises an integrated lubrication system 20 which serves for supplying and distributing a lubricant fluid in the device 4. For example, the lubricant fluid is a lubricant liquid such as oil.

Preferably, the lubrication system 20 is able to cooperate with a lubricant fluid feed system created inside the shaft 6.

For example, the shaft 6 comprises a feed duct 22 and one or more feed orifices 24. When the assembly 2 is in operation, the duct 22 is connected to a reservoir of fluid, not shown, which feeds the assembly 2.

In the example shown, the duct 22 extends longitudinally along the axis X2 inside the shaft 6. For example, the shaft 6 is in the form of a hollow cylinder or tube, the duct 22 consisting of the hollow volume inside the shaft 6. In this instance, the duct 22 is in the shape of a cylinder of radius R1, centered on the axis X2 (FIG. 7).

Each feed orifice 24 is created in the wall of the shaft and extends between the duct 22 and the outside of the shaft 6. The one or more orifices 24 are for example arranged radially with respect to the axis X2, for example extending longitudinally in radial directions perpendicular to the axis X2.

The lubrication system 20 comprises at least one channel 26 to allow lubricant fluid to flow. The channel 26 is formed at the interface 28 between the shaft 6 and the bearing, and more precisely between an outer face 30 of the shaft 6 and an inner face 32 of the bearing. The radius R2 of the shaft 6 is in this instance measured with respect to the outer face 30.

The inner face 32 is oriented towards the outer face 30 of the shaft 6 and faces the outer face 30 when the device 4 is mounted on the shaft 6. The face 32 is a radial face, that is to say that it is perpendicular to a radial direction of the bearing perpendicular to the axis X2.

The channel 26 has an open section in the manner of a rill or a furrow. For example, the channel 26 is bounded by lateral edges that are essentially parallel to one another, and by a bottom. The channel 26 preferably extends in a circular manner about the axis X2.

In this first embodiment, the interface 28 is formed between the shaft 6 and the fixed ring 10. Thus, the inner face 32 corresponds to the inner face of the fixed ring 10.

According to this embodiment, the channel 26 is formed on the outer face 30 of the shaft 6, for example at the surface of the outer face 30.

The channel 26 extends in a circular manner around the shaft 6, being formed on at least one part of the circumference of the shaft 6, preferably over the entire circumference of the shaft 6. As shown in FIG. 5, in this instance the channel 26 extends only over part of the circumference of the shaft 6.

The one or more feed orifices 24 open to the interior of the channel 26, thus making it possible to supply the lubricant fluid from the duct 22 to the channel. In the example shown the one or more feed orifices 24 open into the bottom of the channel 26.

According to variants, multiple—preferably identical—channels 26 are formed on the shaft 6, being spaced apart longitudinally along the axis X2. In this case, at least one feed orifice 24 opens into each of the channels 26. For the sake of simplicity, only one channel 26 is described below, but the description can be applied to the case where multiple channels 26 are present on a single shaft in a single lubrication system 20.

In the example shown in FIGS. 1 to 5, the shaft 6 comprises a single orifice 24 per channel 26, although as a variant the number of orifices 24 per channel 26 may be different, for example greater than or equal to 2, or greater than or equal to 4.

The lubrication system 20 also comprises distribution ducts formed in the bearing and directly or indirectly connected to the channel 26 in order to distribute the lubricant fluid from the channel 26 towards various parts of the bearing.

According to examples, the lubrication system 20 is arranged to distribute the lubricant fluid in order to lubricate internal interfaces between the rings 10, 12 and the cage 14, and/or to lubricate the rolling elements 16, and/or to lubricate the outside of the moving ring 12, in particular when the moving ring 12 is a gearwheel.

The lubrication system 20 is also preferably configured to provide good distribution of the lubricant fluid to various angular portions or regions of the bearing, for example in order to compensate for uneven distribution when the device 4 experiences acceleration during operation.

In the example shown, the lubrication system 20 comprises first distribution ducts 34, second distribution ducts 36 and third distribution ducts 38. As a variant, some or all of these first, second and third distribution ducts 34, 36 and 38 may be present.

The first distribution ducts 34 are formed in the fixed ring 10, extending radially between the inner radial face 32 and an outer face of the fixed ring 10, where they open at an interface with the cage. The first distribution ducts 34 permit the distribution of the lubricant fluid from the channel 26 towards the raceway between the rings 10 and 12.

The second distribution ducts 36 are formed in the fixed ring 10, extending radially between the inner radial face 32 and an outer face of the fixed ring 10, where they open at a recess for receiving the rolling elements 16 in order to distribute the lubricant fluid from the channel 26 to the rolling elements 16.

The third distribution ducts 38 are formed in the moving ring 12, extending radially between an inner radial face and an outer face of the moving ring 12, in order to distribute the lubricant fluid towards the outer face of the moving ring 12. The lower end of the third distribution ducts 38 is for example fed by the lubricant fluid which is supplied by the first or second distribution ducts 34 and 36. The third distribution ducts 38 are thus indirectly fed from the channel 26. In this instance, they are fed with lubricant fluid via the intermediary of the distribution ducts 34 and 36.

Here, the third distribution ducts 38 form outlet orifices which allow the lubricant fluid to leave the device 4.

Preferably, the distribution ducts 34, 36 and 38 each extend in a geometric plane perpendicular to the axis X2 aligned with a channel 26.

The channel 26 comprises at least one constriction 40, or restriction, which locally reduces the section of the channel 26 in order to reduce the flow rate of lubricating fluid flowing in the channel 26 and create a loss of head of the lubricant fluid flowing in the channel.

For example, each constriction 40 comprises a local reduction in the depth of the channel 26 and/or a local reduction in the width of the channel 26 and/or a local modification in the shape of the bottom of the channel 26, for example using an undulating shape for the bottom of the channel 26.

The constriction 40 is located inside the channel 26, but that does not mean that it is necessarily formed directly on one of the walls of the channel 26. The constriction 40 may in particular be formed by an element external to the channel 26, such as an element secured to another part of the assembly 2, which then extends into the channel 26 via the opening of the channel 26 so as to constrict the section of the channel 26.

In general, the one or more constrictions 40 are formed directly on the lateral walls and/or the bottom of the channel 26, for example by locally increasing or decreasing the depth and/or the width of the channel 26, during creation of the channel 26 on the shaft 6.

For example, each constriction 40 locally reduces the section of the channel 26 by at least 5%, preferably by at least 10%, more preferably by at least 40%.

Preferably, the loss of head created by the constrictions 40 within a given channel 26 is between 0 bar and 20 bar, preferably between 5 bar and 12 bar.

According to examples, for a constriction 40, the width of the channel 26, as measured between the opposing walls of the channel 26, is reduced by at least 10%, or by at least 25%, or by at least 50%.

According to other examples, for a constriction 40, the depth of the channel 26, as measured in a radial direction relative to the axis X2, is reduced by at least 10%, or by at least 25%, or by at least 50%.

In the embodiment shown, the channel 26 and the constriction 40 are both formed on the outer face 30 of the shaft 6. It is therefore understood that the elements making up the system 20 are then distributed in the assembly 2 between the shaft 6 and the device 4.

However, according to a second embodiment that is not illustrated, the channel 26 is formed on one or other of the shaft 6 and the bearing (in this case on the face 30 or on the face 32, respectively), and the constrictions 40 are formed on the other of the bearing and the shaft 6.

In this second embodiment, the constrictions 40 are preferably created in the form of elements, such as excrescences or attached parts, which project from the face on which they are formed and which extend into the channel 26 so as to constrict the section of the channel 26.

In one example, which is shown in FIG. 6, the channel is formed on the outer face 30 of the shaft and each of the one or more constrictions 40 associated with this channel include an element, in particular an excrescence or an attached element, formed on the inner face 32 and extending into the channel.

Figure 4A:
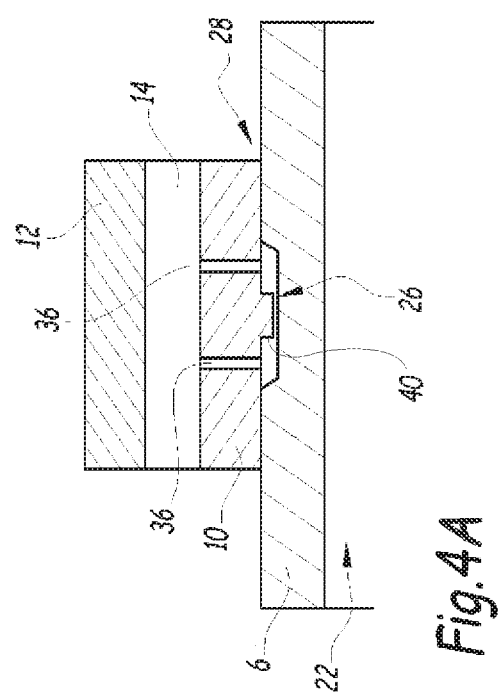
FIG. 4A shows, schematically, a detail of the channel being formed on an outer face of the shaft and the constriction associated with this channel including an element formed on an inner face of the bearing.

In another example, which shown in FIG. 4A, the channel is formed on the inner face 32 of the bearing and each of the one or more constrictions 40 associated with this channel include an element, in particular an excrescence or an attached element, formed on the outer face 30 of the shaft and extending into the channel 26.

In other examples, the constrictions 40 are formed on both faces 30 and 32, whatever the face 30 or 32 on which the channel 26 is formed.

According to a third embodiment, which is not illustrated, the channel and the one or more constrictions 40 are formed on the inner face 32 and therefore on the device 4 (in particular on the fixed ring 10). In this case, the system 20 is completely integrated into the device 4. However, when the feed of lubricant fluid is provided by the shaft 6 as described above, then the dimensions of the system 20 are adapted accordingly, in particular in order that the channels 26 formed on the bearing of the device 4 be aligned with the feed orifices 24. In this embodiment, the orifices 24 opening at the surface 30 of the shaft 6 are considered to open within the channels 26, despite the channels 26 being formed on the face 32, since the face 32 is preferably arranged at a small distance from the face 30 and the orifices 24 are located facing the open part of the channels 26.

For example, the faces 30 and 32 are separated by a distance of less than or equal to 1 cm, or less than or equal to 5 mm, or less than or equal to 1 mm, this distance being measured radially with respect to the axis X2.

Finally, in a fourth embodiment, the fixed ring 10 is replaced with a similar ring which is integrated into the shaft 6 and which therefore does not form part of the device 4. For example, the integrated ring is integral with the shaft 6. The bearing of the device 4 then comprises the moving ring 12 which is mounted in rotation about the integrated ring. In this case, the interface 28 corresponds to the interface between the ring 12 and the integrated ring. The device 4 is then adapted accordingly. In particular, the orifices 24 are modified accordingly so as to pass through the fixed ring.

With the exception of the differences of position of the channel 26 and of the constrictions 40, the description of the first embodiment can be applied to all these other embodiments.

Preferably, whatever the embodiment, the number of constrictions 40 associated with each channel 26 is greater than or equal to one and less than or equal to the number of feed orifices 24 associated with this channel 26, that is to say opening into this channel 26. As a variant, when multiple channels 26 are present, certain channels 26 may have no constrictions 40.

For example, when the shaft 6 comprises multiple feed orifices 24 connected to a same channel 26, and when the channel 26 comprises multiple constrictions 40, the constrictions 40 are distributed along the channel 26 such that each channel portion extending between two consecutive feed orifices 24 comprises at most one constriction 40. As a variant, the channel portions each comprise at least one constriction 40, or even multiple constrictions 40.

In practice, the precise number of constrictions 40 associated with each channel 26, the magnitude of the reduction in section or flow rate created by each constriction 40, the angular distribution of the constrictions 40 around the shaft 6 and/or around the bearing along each channel 26, and in particular the relative position of the constrictions 40 with respect to the orifices 24, are chosen on the basis of the intended applications for the device 4 and/or the assembly 2, in particular in order to promote distribution of the lubricant fluid according to a predefined set of specifications.

By virtue of the embodiments of the invention, each constriction 40 locally restricts the flow of lubricant in the channel 26 so as to create losses of fluid head, thus making it possible to control and optimize the distribution of the lubricant while the device 4 is in operation.

The choice of number, dimensions and siting of the one or more constrictions 40 formed in each channel 26 makes it possible to regulate as desired the manner in which the fluid flows in the channel, for example in order to direct a greater or smaller part of the flow to certain distribution ducts.

FIG. 7 shows a shaft 6' according to another embodiment, performing a role similar to the shaft 6. The shaft 6' is provided by way of illustrative example, showing various variant embodiments of the constrictions 40.

In this example, the shaft 6' comprises a channel 26 which in this instance extends over the entire circumference of the shaft 6', contrary to the channel 26 of the example of FIG. 5 which extends only over part of the circumference of the shaft 6. The shaft 6' also comprises four feed orifices 24 associated with the channel 26 and extending radially, being spaced apart in pairs by angles of 90°.

For example, the shaft 6' comprises another channel, which is not shown and is offset from the channel 26 along the axis X2 with respect to the plane of FIG. 7. This other channel is associated with feed orifices 24' that are similar to the orifices 24 and are shown by way of dashed lines.

In the example shown, the shaft 6' comprises four constrictions 40, respectively denoted 40a, 40b, 40c and 40d, each formed by a reduction in the depth of the channel 26, obtained by locally creating, on the outer face 30 of the shaft 6', a raised portion or excrescence, for example integral with the shaft 6', which extends from the bottom of the channel.

By way of example, the constriction 40a comprises an excrescence 50 in the form of a plateau having a rounded slope, that is to say whose height varies in non-linear fashion along the channel 26. The constriction 40b comprises an excrescence 52 in the form of a plateau having a linear slope, that is to say whose height varies in linear fashion along the channel 26. The excrescence 40c comprises multiple contiguous flat plateaus 54, 56, 58 having different heights. The excrescence 40d comprises a single flat plateau.

The number of constrictions 40, their shape and distribution on the shaft 6' may be different. The constrictions 40a, 40b, 40c and 40d are formed on the shaft 6' itself. However, the shapes of the constrictions 40a, 40b, 40c and 40d may be transposed to the embodiments where the constrictions 40 are formed on the device 4.

The embodiments and variants set out above may be combined with one another to produce new embodiments.

What is claimed is:

1. A mechanical assembly, comprising:
   a shaft;
   a mechanical device comprising:
      a bearing mounted on the shaft and including at least one ring that is able to move in rotation about the shaft;
   a lubrication system comprising:
      a channel to allow lubricant fluid to flow, formed at the interface between the shaft and the bearing;
      distribution ducts for lubricant fluid, formed in the bearing and fluidically connected to the channel; wherein
      the channel comprises at least one constriction to create a loss of head of the lubricant fluid flowing in the channel.

2. The mechanical assembly according to claim 1, wherein the channel and at least one
   constriction are formed on an inner face of the bearing, facing an outer face of the shaft.

3. The mechanical device for forming a mechanical assembly according to claim 2, wherein
   the channel and the at least one constriction being formed on an inner face of the bearing intended to face an outer face of the shaft when the bearing is mounted on the shaft.

4. The mechanical assembly according to claim 1, wherein the channel is formed on an outer face of the shaft, the at least one constriction associated with this channel including an element formed on an inner face of the bearing, facing the outer face of the shaft, the element extending into the channel;
   or the channel is formed on an inner face of the bearing facing an outer face of the shaft, the at least one constriction associated with this channel including an element formed on the outer face of the shaft, the element extending into the channel.

5. The mechanical assembly according to claim 1, wherein the channel and the at least one constriction are formed on an outer face of the shaft.

6. The mechanical assembly according to claim 1, wherein the shaft includes a feed duct for lubricant fluid and at least one feed orifice, the at least one feed orifice fluidically connecting the feed duct to a supply channel.

7. The mechanical assembly according to claim 4, wherein the shaft comprises multiple feed orifices connected to the channel, and the channel comprises multiple constrictions, the constrictions being distributed along the channel such that each channel portion extending between two consecutive feed orifices comprises at most one constriction.

8. The mechanical assembly according to claim 1, wherein the at least one constriction comprises a local reduction in the depth of the channel and/or a local reduction in the width of the channel and/or a local modification in the shape of the bottom of the channel.

9. The mechanical assembly according to claim 1, wherein the bearing comprises a fixed ring
  mounted directly on the shaft, the moving ring being mounted in rotation about the fixed ring, the inner face of the bearing being an inner face of the fixed ring.

10. The mechanical assembly according to claim 1, wherein the bearing is a ball bearing.

\* \* \* \* \*